US008719196B2

(12) United States Patent
Thompson

(10) Patent No.: US 8,719,196 B2
(45) Date of Patent: *May 6, 2014

(54) METHODS FOR MONITORING COMPUTER RESOURCES USING A FIRST AND SECOND MATRIX, AND A FEATURE RELATIONSHIP TREE

(75) Inventor: Erskine Thompson, Apache Junction, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 367 days.

This patent is subject to a terminal disclaimer.

(21) Appl. No.: 13/330,346

(22) Filed: Dec. 19, 2011

(65) Prior Publication Data

US 2013/0159502 A1    Jun. 20, 2013

(51) Int. Cl.
*G06F 15/18* (2006.01)

(52) U.S. Cl.
USPC .......................................................... 706/15

(58) Field of Classification Search
CPC .................................................. H04L 63/1408
USPC ......... 706/12, 15, 62; 709/224–225; 718/100, 718/104–5
See application file for complete search history.

(56) References Cited

U.S. PATENT DOCUMENTS

| | | |
|---|---|---|
| 4,639,882 A | 1/1987 | Keats |
| 4,707,796 A | 11/1987 | Calabro et al. |
| 4,761,748 A | 8/1988 | Le Rat et al. |
| 4,821,220 A | 4/1989 | Duisberg |
| 4,823,290 A | 4/1989 | Fasack et al. |
| 4,937,763 A | 6/1990 | Mott |
| 5,062,055 A | 10/1991 | Chinnaswamy et al. |
| 5,067,107 A | 11/1991 | Wade |
| 5,101,348 A | 3/1992 | Arrowood et al. |
| 5,103,394 A | 4/1992 | Blasciak |
| 5,161,116 A | 11/1992 | Schneider et al. |
| 5,282,213 A | 1/1994 | Leigh et al. |
| 5,307,499 A | 4/1994 | Yin |
| 5,367,473 A | 11/1994 | Chu et al. |
| 5,375,070 A | 12/1994 | Hershey et al. |
| 5,432,932 A | 7/1995 | Chen et al. |
| 5,450,406 A | 9/1995 | Esaki et al. |
| 5,459,837 A | 10/1995 | Caccavale |
| 5,459,868 A | 10/1995 | Fong |
| 5,475,625 A | 12/1995 | Glaschick |
| 5,475,843 A | 12/1995 | Halviatti et al. |
| 5,483,468 A | 1/1996 | Chen et al. |
| 5,491,791 A | 2/1996 | Glowny et al. |
| 5,504,921 A | 4/1996 | Dev et al. |

(Continued)

OTHER PUBLICATIONS

Ponomarev, Reducing Power Requirements of Instruction Scheduling Through Dynamic Allocation of Multiple Datapath Resources. State University of New York. Dec. 1, 2001.

(Continued)

*Primary Examiner* — David Vincent
(74) *Attorney, Agent, or Firm* — Chris A. Watt

(57) ABSTRACT

One embodiment of a method of the present invention for monitoring computer resources provides for retrieving a set of resource-metric records for a predetermined time interval, forming a first mathematical matrix containing metric's values arranged on date-time and resource-metric axes, creating a second mathematical matrix containing features and a third mathematical matrix containing weights, building a feature relationship tree, generating a predicted value for the resource-metric identifier, determining a variance between predicted value and metric's value, and triggering an alert if the variance exceeds a predetermined alert threshold.

19 Claims, 8 Drawing Sheets

(56) References Cited

U.S. PATENT DOCUMENTS

| | | |
|---|---|---|
| 5,506,955 A | 4/1996 | Chen et al. |
| 5,513,126 A | 4/1996 | Harkins et al. |
| 5,553,235 A | 9/1996 | Chen et al. |
| 5,555,191 A | 9/1996 | Hripcsak |
| 5,572,672 A | 11/1996 | Dewitt et al. |
| 5,581,482 A | 12/1996 | Wiedenman et al. |
| 5,581,696 A | 12/1996 | Kolawa et al. |
| 5,586,254 A | 12/1996 | Kondo et al. |
| 5,598,429 A | 1/1997 | Marshall |
| 5,615,135 A | 3/1997 | Waclawsky et al. |
| 5,615,323 A | 3/1997 | Engel et al. |
| 5,616,904 A | 4/1997 | Fernadez |
| 5,619,656 A | 4/1997 | Graf |
| 5,621,663 A | 4/1997 | Skagerling |
| 5,634,009 A | 5/1997 | Iddon et al. |
| 5,636,344 A | 6/1997 | Lewis |
| 5,655,081 A | 8/1997 | Bonnell et al. |
| 5,661,668 A | 8/1997 | Yemini et al. |
| 5,668,944 A | 9/1997 | Berry |
| 5,675,510 A | 10/1997 | Coffey et al. |
| 5,684,945 A | 11/1997 | Chen et al. |
| 5,696,486 A | 12/1997 | Poliquin et al. |
| 5,696,701 A | 12/1997 | Burgess et al. |
| 5,699,403 A | 12/1997 | Ronnen |
| 5,732,273 A | 3/1998 | Srivastava et al. |
| 5,740,441 A | 4/1998 | Yellin et al. |
| 5,748,098 A | 5/1998 | Grace |
| 5,752,062 A | 5/1998 | Gover et al. |
| 5,758,071 A | 5/1998 | Burgess et al. |
| 5,778,230 A | 7/1998 | Wimble et al. |
| 5,796,663 A | 8/1998 | Park et al. |
| 5,799,154 A | 8/1998 | Kuriyan |
| 5,802,256 A | 9/1998 | Heckerman et al. |
| 5,815,718 A | 9/1998 | Tock |
| 5,819,028 A | 10/1998 | Manghirmalani et al. |
| 5,845,125 A | 12/1998 | Nishimura et al. |
| 5,850,388 A | 12/1998 | Anderson et al. |
| 5,870,540 A | 2/1999 | Wang et al. |
| 5,896,536 A | 4/1999 | Lindsey |
| 5,901,315 A | 5/1999 | Edwards et al. |
| 5,923,834 A | 7/1999 | Thieret et al. |
| 5,948,113 A | 9/1999 | Johnson et al. |
| 5,949,678 A | 9/1999 | Wold et al. |
| 5,956,662 A | 9/1999 | Hemker et al. |
| 5,974,237 A | 10/1999 | Shurmer et al. |
| 5,974,457 A | 10/1999 | Waclawsky et al. |
| 5,978,594 A | 11/1999 | Bonnell et al. |
| 5,987,249 A | 11/1999 | Grossman et al. |
| 5,991,881 A | 11/1999 | Conklin et al. |
| 6,006,264 A | 12/1999 | Colby et al. |
| 6,021,437 A | 2/2000 | Chen et al. |
| 6,026,234 A | 2/2000 | Hanson et al. |
| 6,026,237 A | 2/2000 | Berry et al. |
| 6,028,842 A | 2/2000 | Chapman et al. |
| 6,041,287 A | 3/2000 | Dister et al. |
| 6,042,614 A | 3/2000 | Davidson et al. |
| 6,044,335 A | 3/2000 | Ksendzov |
| 6,058,102 A | 5/2000 | Drysdale et al. |
| 6,058,393 A | 5/2000 | Meier et al. |
| 6,061,518 A | 5/2000 | Hoffman |
| 6,067,412 A | 5/2000 | Blake et al. |
| 6,072,777 A | 6/2000 | Bencheck et al. |
| 6,073,089 A | 6/2000 | Baker et al. |
| 6,076,083 A | 6/2000 | Baker |
| 6,081,797 A | 6/2000 | Hittt |
| 6,085,029 A | 7/2000 | Kolawa et al. |
| 6,106,572 A | 8/2000 | Halpern |
| 6,108,616 A | 8/2000 | Borchers et al. |
| 6,108,703 A | 8/2000 | Leighton et al. |
| 6,108,800 A | 8/2000 | Asawa |
| 6,115,393 A | 9/2000 | Engel et al. |
| 6,118,936 A | 9/2000 | Lauer et al. |
| 6,118,940 A | 9/2000 | Alexander, III et al. |
| 6,119,074 A | 9/2000 | Sarangapani |
| 6,119,247 A | 9/2000 | House et al. |
| 6,138,122 A | 10/2000 | Smith et al. |
| 6,139,198 A | 10/2000 | Danforth et al. |
| 6,145,121 A | 11/2000 | Levy et al. |
| 6,149,318 A | 11/2000 | Chase et al. |
| 6,151,701 A | 11/2000 | Humphreys et al. |
| 6,154,736 A | 11/2000 | Chickering et al. |
| 6,161,200 A | 12/2000 | Rees et al. |
| 6,167,398 A | 12/2000 | Wyard et al. |
| 6,182,022 B1 | 1/2001 | Mayle et al. |
| 6,182,157 B1 | 1/2001 | Schlener et al. |
| 6,185,598 B1 | 2/2001 | Farber et al. |
| 6,216,119 B1 | 4/2001 | Jannarone |
| 6,222,652 B1 | 4/2001 | Roberts |
| 6,249,755 B1 | 6/2001 | Yemini et al. |
| 6,263,298 B1 | 7/2001 | Kerman et al. |
| 6,269,401 B1 | 7/2001 | Fletcher et al. |
| 6,314,565 B1 | 11/2001 | Kenner et al. |
| 6,320,585 B1 | 11/2001 | Engel et al. |
| 6,327,550 B1 | 12/2001 | Vinberg et al. |
| 6,327,677 B1 | 12/2001 | Garg et al. |
| 6,330,602 B1 | 12/2001 | Law et al. |
| 6,359,976 B1 | 3/2002 | Kalyanpur et al. |
| 6,374,297 B1 | 4/2002 | Wolf et al. |
| 6,377,907 B1 | 4/2002 | Waclawski |
| 6,381,306 B1 | 4/2002 | Lawson et al. |
| 6,405,219 B2 | 6/2002 | Saether et al. |
| 6,405,250 B1 | 6/2002 | Lin et al. |
| 6,421,726 B1 | 7/2002 | Kenner et al. |
| 6,430,618 B1 | 8/2002 | Karger et al. |
| 6,446,058 B1 | 9/2002 | Brown |
| 6,453,346 B1 | 9/2002 | Garg et al. |
| 6,466,929 B1 | 10/2002 | Brown et al. |
| 6,470,464 B2 | 10/2002 | Bertram et al. |
| 6,484,129 B2 | 11/2002 | Klein et al. |
| 6,505,246 B1 | 1/2003 | Land et al. |
| 6,513,065 B1 | 1/2003 | Hafez et al. |
| 6,553,413 B1 | 4/2003 | Leighton et al. |
| 6,557,035 B1 | 4/2003 | McKnight |
| 6,615,259 B1 | 9/2003 | Nguyen et al. |
| 6,643,613 B2 | 11/2003 | McGee et al. |
| 6,658,367 B2 | 12/2003 | Conrad |
| 6,742,178 B1 | 5/2004 | Berry et al. |
| 6,760,903 B1 | 7/2004 | Morshed et al. |
| 6,792,456 B1 | 9/2004 | Hellerstein et al. |
| 6,810,356 B1 | 10/2004 | Garcia-Franco et al. |
| 6,823,382 B2 | 11/2004 | Stone |
| 6,836,800 B1 | 12/2004 | Sweet et al. |
| 6,859,739 B2 | 2/2005 | Wegerich et al. |
| 6,968,540 B2 | 11/2005 | Beck et al. |
| 7,016,816 B2 | 3/2006 | Mott |
| 7,076,695 B2 | 7/2006 | McGee et al. |
| 7,219,034 B2 | 5/2007 | McGee et al. |
| 7,233,886 B2 | 6/2007 | Wegerich et al. |
| 7,403,869 B2 | 7/2008 | Wegerich et al. |
| 7,716,367 B1 | 5/2010 | Leighton et al. |
| 7,826,909 B2 | 11/2010 | Attarwala |
| 7,930,044 B2 | 4/2011 | Attarwala |
| 8,032,328 B2 | 10/2011 | Samples et al. |
| 8,036,760 B2 | 10/2011 | Mehta et al. |
| 2001/0052016 A1 | 12/2001 | Skene et al. |
| 2001/0052087 A1 | 12/2001 | Garg et al. |
| 2002/0012011 A1 | 1/2002 | Roytman et al. |
| 2002/0019870 A1 | 2/2002 | Chirashnya et al. |
| 2002/0049838 A1 | 4/2002 | Sylor et al. |
| 2002/0052942 A1 | 5/2002 | Swildens et al. |
| 2002/0054169 A1 | 5/2002 | Richardson |
| 2002/0090134 A1 | 7/2002 | Van Zon |
| 2002/0095661 A1 | 7/2002 | Angel et al. |
| 2002/0111755 A1 | 8/2002 | Valadarsky et al. |
| 2002/0123865 A1 | 9/2002 | Whitney et al. |
| 2002/0133757 A1 | 9/2002 | Bertram et al. |
| 2002/0152185 A1 | 10/2002 | Satish Jamadagni |
| 2002/0152305 A1 | 10/2002 | Jackson et al. |
| 2002/0158918 A1 | 10/2002 | Feibush et al. |
| 2002/0159386 A1 | 10/2002 | Grosdidier et al. |
| 2002/0165892 A1 | 11/2002 | Grumann et al. |
| 2002/0169870 A1 | 11/2002 | Vosseler et al. |
| 2002/0173997 A1 | 11/2002 | Menard et al. |
| 2002/0174174 A1 | 11/2002 | Ramraj et al. |

(56) References Cited

U.S. PATENT DOCUMENTS

| | | |
|---|---|---|
| 2002/0183972 A1 | 12/2002 | Enck et al. |
| 2002/0184065 A1 | 12/2002 | Menard et al. |
| 2002/0184615 A1 | 12/2002 | Sumner et al. |
| 2002/0198879 A1 | 12/2002 | Schwarcz |
| 2002/0198985 A1 | 12/2002 | Fraenkel et al. |
| 2003/0005362 A1 | 1/2003 | Miller et al. |
| 2003/0009507 A1 | 1/2003 | Shum |
| 2003/0014692 A1 | 1/2003 | James et al. |
| 2003/0018241 A1 | 1/2003 | Mannheimer |
| 2003/0018494 A1 | 1/2003 | Bronstein et al. |
| 2003/0023712 A1 | 1/2003 | Zhao et al. |
| 2003/0028631 A1 | 2/2003 | Rhodes |
| 2003/0033404 A1 | 2/2003 | Richardson |
| 2003/0088542 A1 | 5/2003 | McGee et al. |
| 2006/0029097 A1 | 2/2006 | McGee et al. |
| 2007/0030842 A1 | 2/2007 | Borden et al. |
| 2008/0016412 A1 | 1/2008 | White et al. |
| 2009/0070280 A1 | 3/2009 | Beygelzimer et al. |

OTHER PUBLICATIONS

Oct. 11, 2013 Notice of Allowance in related U.S. Appl. No. 13/330,364.

METHODS FOR MONITORING COMPUTER RESOURCES USING A FIRST AND SECOND MATRIX, AND A FEATURE RELATIONSHIP TREE

CROSS REFERENCE TO RELATED PATENT APPLICATIONS

This patent application is related to U.S. patent application Ser. No. 13/330,364 entitled "Systems for Monitoring Computer Resources" concurrently filed herewith and also assigned to Go Daddy Operating Company, LLC.

FIELD OF THE INVENTION

The present invention relates in general to monitoring computer resources.

BACKGROUND OF THE INVENTION

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

For Internet users and businesses alike, the Internet continues to be more and more valuable. People are increasingly using the Web for everyday tasks such as social networking, shopping, banking, paying bills, and consuming media and entertainment. E-commerce is growing, with businesses delivering more services and content across the Internet, communicating and collaborating online, and inventing new ways to connect with each other.

Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting providers typically provide the hardware, software, and electronic communication means necessary to connect multiple websites to the Internet. A single hosting provider may literally host thousands of websites on one or more hosting servers.

Websites may be created using HyperText Markup Language (HTML) to generate a standard set of tags that define how the webpages for the website are to be displayed. Users of the Internet may access content providers' websites using software known as an Internet browser, such as MICROSOFT INTERNET EXPLORER, MOZILLA FIREFOX, or GOOGLE CHROME. After the browser has located the desired webpage, it requests and receives information from the webpage, typically in the form of an HTML document, and then displays the webpage content for the user. The user then may view other webpages at the same website or move to an entirely different website using the browser.

Browsers are able to locate specific websites because each computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server information is stored within the registry, and a registrar is the authoritative source for the contact information related to the domain name. Such registries are referred to as "thin" registries. Most gTLDs are organized through a central domain name Shared Registration System (SRS) based on their TLD.

The process for registering a domain name with .com, .net, .org, and some other TLDs allows an Internet user to use an ICANN-accredited registrar to register their domain name. For example, if an Internet user, John Doe, wishes to register the domain name "mycompany.com," John Doe may initially determine whether the desired domain name is available by contacting a domain name registrar. The Internet user may make this contact using the registrar's webpage and typing the desired domain name into a field on the registrar's webpage created for this purpose. Upon receiving the request from the Internet user, the registrar may ascertain whether "mycompany.com" has already been registered by checking the SRS database associated with the TLD of the domain name. The results of the search then may be displayed on the webpage to thereby notify the Internet user of the availability of the domain name. If the domain name is available, the Internet user may proceed with the registration process. Otherwise, the Internet user may keep selecting alternative domain names until an available domain name is found. Domain names are typically registered for a period of one to ten years with first rights to continually re-register the domain name.

An individual or entity's domain name is increasingly the anchor around which their online presence is maintained. For example, a company's website (www.companyname.com) and email system (john.doe@companyname.com) utilize the company's domain name as an integral part of their architecture. Similarly, many Internet users use their email address, and therefore their domain name, as a means of identification on social websites, which have proliferated in recent years. Social websites are social networking services that focus on building and verifying online social networks for communities of people who share interests and activities, or who are interested in exploring the interests and activities of others, and which necessitates the use of software. Most social websites are Internet based and provide a collection of various ways for users to interact, such as chat, messaging, email, video, voice chat, personal information sharing, image sharing, video sharing, file sharing, status updates, blogging, discussion groups, commentary, etc. The main types of social networking services are those which contain directories of some categories (such as former classmates), means to connect with friends (usually with self-description pages), and/or recommendation systems linked to trust. Popular methods now combine many of these, with FACEBOOK, TWITTER, YOUTUBE, LINKEDIN, MYSPACE, BEBO, PHOTOBUCKET, SNAPFISH, WINDOWS LIVE PHOTOS, WEBSHOTS, and FLICKR being but a few examples.

Such social websites often post their members' public webpages for all Internet users to view, without authentication or login. Conversely, members' private webpages may only be accessed and viewed by the member. The private webpages generally require member authentication and provide the member with tools to manage his public webpage, communicate with other members, and/or otherwise manage his social website membership.

Many social websites, typically those that receive or share sensitive information (as well as websites associated with banks, credit card companies, and online businesses), may require Internet users to login to the website with a secure username and password before accessing the website's content.

The username/password system is a common form of secret authentication data used to control website access. The username/password is kept secret from those not allowed access. Those wishing to gain access are tested on whether or not they have a valid (recognized) username and whether they know the associated password. Internet users are granted or denied access to websites accordingly.

Many social websites have different rules governing the creation of usernames and passwords. Some require passwords that include a complex combination of letters, numbers, and other characters. Others have no restrictions whatsoever. With the proliferation of login-access websites, Internet users often must remember dozens (or more) different username/password combinations, one for each secure website they wish to access. This has resulted in what has come to be known as "password fatigue."

Partly in response to these issues, the concept of the "digital identity" has evolved. A digital identity is a set of characteristics by which a person or thing is recognizable or distinguished in the digital realm. Digital identity allows for the electronic recognition of an individual or thing without confusing it for someone or something else.

There are many applications for an Internet user's digital identity, including authenticating the user before permitting access to a website. One method for such authentication includes the use of a URL. URL-based digital identity systems (such as OPENID) utilize a framework based on the concept that any individual or entity can identify themselves on the Internet with a URL provided by a Digital Identity Provider (e.g., johndoe.openid.com). The Digital Identity Provider maintains an Identity Server on which a Digital Identity Database (a database of provided digital identity URLs and the corresponding authentication passwords) is stored.

Once obtained, the Internet user may utilize their digital identity URL to access various websites. For example, to login to an OpenID-enabled website, the user enters their OpenID (e.g., johndoe.openid.com) in the username box. The user is then momentarily redirected to the user's Digital Identity Provider's website (or an authentication window appears) to login using whatever password they have set up with their Digital Identity Provider. Once authenticated, the Digital Identity Provider sends the participating website an encrypted message (a token) confirming the identity of the person logging in. There are currently numerous Digital Identity Providers offering URL-based (OpenID) digital identity services, meaning they offer digital identity URLs and servers to authenticate them.

One of the problems facing companies doing business online is verifying that digital identity actually belongs to a real human being (person) and that this particular real human being is not impersonating somebody else. Most validation systems today do it by sending an email message to person's email address. The email message typically contains a unique link or code that person should provide back to the verifier (often via a verifier's website). These systems are not able to validate the real identity of a person because the systems only check whether the requester has control over the email account.

As previously discussed the hosting companies allow a variety of entities and individuals to host websites, email, and other Internet services on hosting computers and networks. Clients expect the hosting computers and networks to work fast and without interruptions. Larger companies may have their own "in-house" hosting computers and networks to host their websites. Again, fast and smooth operation of the hosting computers and networks is expected. Thus, monitoring of resources on computer servers and computer networks is desired.

Applicant hereby proposes novel systems and methods for monitoring computer resources.

DETAILED DESCRIPTION AND PREFERRED EMBODIMENT

Figure 1:
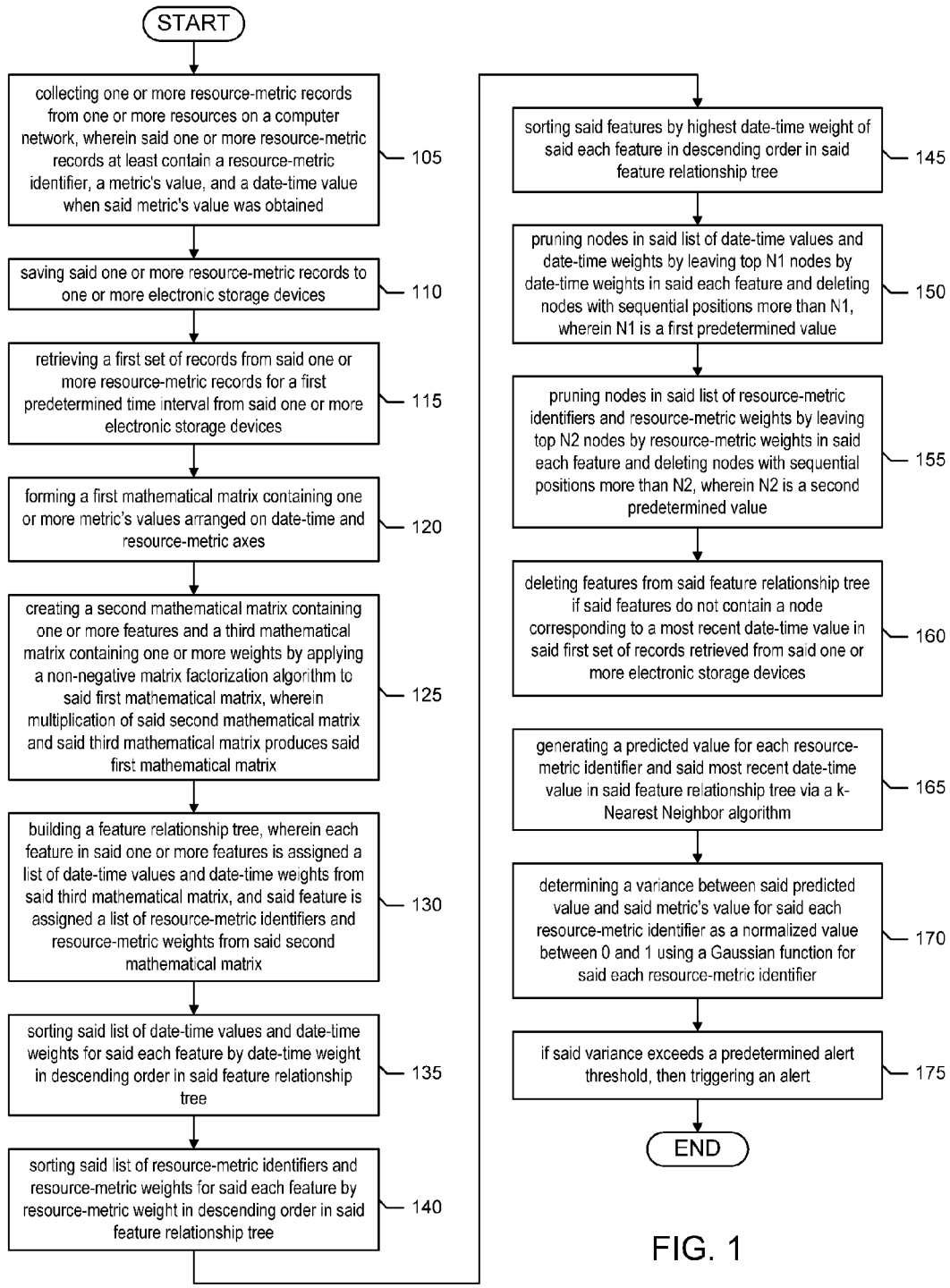
FIG. 1 is a flowchart illustrating a best mode embodiment of a method of the present invention.

The present invention will now be discussed in detail with regard to the attached drawing figures which were briefly described above. In the following description, numerous specific details are set forth illustrating the Applicant's best mode for practicing the invention and enabling one of ordinary skill in the art of making and using the invention. It will be obvious, however, to one skilled in the art that the present invention may be practiced without many of these specific details. In other instances, well-known machines and method steps have not been described in particular detail in order to avoid unnecessarily obscuring the present invention. Unless otherwise indicated, like parts and method steps are referred to with like reference numerals.

Generally, it is desirable to achieve and maintain good computer (resources) performance in a hosting environment. Good computer performance may be characterized by short response time for a given task, high throughput (rate of processing a task), low utilization of computing resource(s), high availability of the computing system or application, fast (or highly compact) data compression and decompression, high bandwidth (or short data transmission time) and others.

Adaptive monitoring is a new approach to resource monitoring that employs advanced data collection and machine learning techniques to overcome some of the limitations inherent to traditional monitoring techniques.

Traditional monitors usually work by linking a target resource to some sort of predetermined pass/fail test condition, e.g., CPU utilization <X % or total messages in queue <Y, and if the resource has been found to be exceeding those limits, an alert is generated.

Defining monitors in this manner can become challenging when dealing with many target resources in a large complex architecture. For example, message oriented architectures such as 4GH® provisioning system can utilize hundreds (or even thousands) of individual queues in need of monitoring. 4GH® is Go Daddy® Fourth-Generation Hosting. It is a flexible hosting platform that matches performance with demand. If customer site's traffic spikes, 4GH® responds by allocating more resources and keeping the site live. If customer site starts small, but is growing, 4GH® grows with it so customer doesn't have to manually upgrade and experience any unnecessary downtime.

4GH® "pools" the resources of many servers and customer site's content resides on multiple servers. This networked system helps achieve a high reliability, beyond 99.9%, for customer website because if one server shuts down, only a fraction of the total resources are lost. 4GH® has resources in reserve which are always available to allocate when necessary.

Identifying resources and metrics on a large complex architecture individually, and defining failure conditions for each resource and metric, can prove to be a daunting task, especially if the queue's behavioral patterns shift as the parent architecture evolves.

The adaptive monitor collects key metrics for a given resource, analyzes the collected data to determine typical usage patterns (independent of human interaction), and alerts when the resource has been found to be operating outside of these "learned" boundaries.

The systems and methods of the present invention envision developing a framework that supports the storage, retrieval, and analysis of various resource metrics. The collected data for all resources may be centrally located and managed by the framework, which may serve as a data access layer. Data archival tools may also be developed as the framework may need to be capable of supporting large volumes of data.

The framework may provide a whole host of tools designed to simplify data analysis. By peering into the data from multiple viewpoints the framework may be able to characterize the aggregate data and tell the users important information about the health and performance of the resources.

Various tools may be exposed to users via an API (application programming interface). A feature extraction may be one of the analysis tools exposed by the framework. Features may be identified by dissecting a dataset to find new data rows that can be used in combination to reconstruct the original dataset. These new data rows are individually weighted and directly correlate to the rows of the original dataset.

The features identified by the framework may point out anomalies in the data. For example, if a particular queue—which normally holds less than ten messages—is found to contain more than a hundred, the framework may identify a feature that directly correlates to that queue and polling interval. If the feature is found to be weighted heavily to only the most recent polling cycle then the message backlog must be atypical and an alert might be generated. On the other hand, if the same feature is found to be weighted evenly across multiple polling cycles, at regular intervals, then no alert is necessary as the feature simply represents a recurring spike in traffic.

Various metrics (e.g., Apache ActiveMQ™ message queue) may be added for monitoring to the existing Monitor Service endpoints. The Monitor Services maybe implemented on Java Platform, Enterprise Edition (J2EE platform), Microsoft .Net environment, and may others.

An exemplary embodiment of a best mode method of present invention is shown in FIG. 1. The method comprises the steps of: collecting one or more resource-metric records from one or more resources on a computer network, wherein said one or more resource-metric records at least contain a resource-metric identifier, a metric's value, and a date-time value when said metric's value was obtained (Step 105), saving said one or more resource-metric records to one or more electronic storage devices (Step 110), retrieving a first set of records from said one or more resource-metric records for a first predetermined time interval from said one or more electronic storage devices (Step 115), forming a first mathematical matrix containing one or more metric's values arranged on date-time and resource-metric axes (Step 120), creating a second mathematical matrix containing one or more features and a third mathematical matrix containing one or more weights by applying a non-negative matrix factorization algorithm to said first mathematical matrix, wherein multiplication of said second mathematical matrix and said third mathematical matrix produces said first mathematical matrix (Step 125), building a feature relationship tree, wherein each feature in said one or more features is assigned a list of date-time values and date-time weights from said third mathematical matrix, and said feature is assigned a list of resource-metric identifiers and resource-metric weights from said second mathematical matrix (Step 130), sorting said list of date-time values and date-time weights for said each feature by date-time weight in descending order in said feature relationship tree (Step 135), sorting said list of resource-metric identifiers and resource-metric weights for said each feature by resource-metric weight in descending order in said feature relationship tree (Step 140), sorting said features by highest date-time weight of said each feature in descending order in said feature relationship tree (Step 145), pruning nodes in said list of date-time values and date-time weights by leaving top N1 nodes by date-time weights in said each feature and deleting nodes with sequential positions more than N1, wherein N1 is a first predetermined value (Step 150), pruning nodes in said list of resource-metric identifiers and resource-metric weights by leaving top N2 nodes by resource-metric weights in said each feature and deleting nodes with sequential positions more than N2, wherein N2 is a second predetermined value (Step 155), deleting features from said feature relationship tree if said features do not contain a node corresponding to a most recent date-time value in said first set of records retrieved from said one or more electronic storage devices (Step 160), generating a predicted value for each resource-metric identifier and said most recent date-time value in said feature relationship tree via a k-Nearest Neighbor algorithm (Step 165), determining a variance between said predicted value and said metric's value for said each resource-metric identifier as a normalized value between 0 and 1 using a Gaussian function for said each resource-metric identifier (Step 170), and if said variance exceeds a predetermined alert threshold, then triggering an alert (Step 175).

The resource-metric records may be collected from a variety of resources on the computer network. A sample set of resource-metric records is shown in Table 1. Optionally, Resources and Metrics may be separated into their own fields (columns) in the dataset. Resources, Metrics, and Resource-Metric may be represented by a name, a code, a numeric identifier, or any other identifier.

TABLE 1

Example of resource-metric records

| Resource-Metric | Date-Time Value | Metric Value |
|---|---|---|
| Resource-Metric A | 12/6/11 17:30:00 | 0 |
| Resource-Metric B | 12/6/11 17:30:00 | 50 |
| Resource-Metric A | 12/6/11 17:00:00 | 1 |
| Resource-Metric B | 12/6/11 17:00:00 | 8 |
| ... | ... | ... |
| Resource-Metric A | 12/6/11 12:00:00 | 0 |
| Resource-Metric B | 12/6/11 12:00:00 | 9 |

A resource may include a computer, a server, a storage device, a hard drive, a printer, a network node, a router, etc.

A metric may include speed, utilization, message queue length, availability, response time, channel capacity, latency, completion time, service time, bandwidth, throughput, relative efficiency, scalability, performance per watt, compression ratio, instruction path length, speedup (how much a parallel algorithm is faster than a corresponding sequential algorithm), instructions per second, FLOPS (number of floating-point operations per second), Giga-updates per second (a measure of how frequently the RAM can be updated), various CPU benchmarks, and many others.

The resource-metric records may be saved to and retrieved from a variety of electronic storage devices. The storage devices may include RAM, magnetic drives, optical drives, etc.

The first set of records retrieved from the resource-metric records is converted to the input (or first) matrix containing a column for each resource-metric and a row for each date-time value. The use of columns for resource-metrics and rows for date-time values is exemplary. Columns and rows may change places.

First matrix $\quad$ Formula 1

$$\text{Date-time values} \begin{pmatrix} \overbrace{0 \quad 50}^{\text{Resource-Metrics}} \\ 1 \quad 8 \\ \ldots \quad \ldots \\ 0 \quad 9 \end{pmatrix}.$$

The input matrix is then fed into a non-negative matrix factorization (NMF) algorithm. The NMF algorithm generates feature and weight information in the form of two new matrices (second and third matrices) which can be combined to recreate the original matrix using simple matrix multiplication.

In a sample embodiment the columns of the features matrix correspond to the columns of the first matrix. The rows of the weights matrix correspond to the rows of the first matrix. The columns of the weights matrix correspond to features, i.e., the first row of the features matrix corresponds to the first column of the weights matrix, the second row of the features matrix corresponds to the second column of the weights matrix, etc.

Creating features and weights (second and third) $\quad$ Formula 2
matrices by applying a non-negative matrix
factorization algorithm to the input (first) matrix $$nmf \begin{pmatrix} 0 & 50 \\ 1 & 8 \\ \ldots & \ldots \\ 0 & 9 \end{pmatrix} = \text{features} \begin{pmatrix} 0.0 & 7.7 \\ 0.3 & 0.5 \\ 0.0 & 7.8 \end{pmatrix} \times \text{weights} \begin{pmatrix} 2.6 & 0.2 & 3.8 \\ 0.7 & 0.8 & 0.1 \\ \ldots & \ldots & \ldots \\ 0.8 & 0.1 & 0.3 \end{pmatrix}.$$

The example above illustrates using NMF to identify 3 features and their corresponding weights. In this example features 1 and 3 both correlate heavily to second resource-metric and each are weighted heavily to the first date-time value.

The non-negative matrix factorization algorithm may also be known as a self modeling curve resolution and positive matrix factorization. There are several ways in which the features and weights matrices may be found, e.g., the multiplicative update method, gradient descent algorithms, alternating non-negative least squares, projected gradient, and others.

A variety of other algorithms may be used to create features and weights matrices from the input (first) matrix.

An example of a feature relationship tree is shown in Table 2 below.

TABLE 2

Example of a feature relationship tree

Feature 1
    Date-time values
        12/6/11 17:30:00: weight = 2.6
        12/6/11 17:00:00: weight = 0.7
        ...
        12/6/11 12:00:00: weight = 0.8
    Resource-Metrics
        Resource-Metric A: weight = 0.0
        Resource-Metric B: weight = 7.7
Feature 2
    Date-time values
        12/6/11 17:30:00: weight = 0.2
        12/6/11 17:00:00: weight = 0.8

TABLE 2-continued

Example of a feature relationship tree

```
        . . .
        12/6/11 12:00:00: weight = 0.1
    Resource-Metrics
        Resource-Metric A: weight = 0.3
        Resource-Metric B: weight = 0.5
Feature 3
    Date-time values
        12/6/11 17:30:00: weight = 3.8
        12/6/11 17:00:00: weight = 0.1
        . . .
        12/6/11 12:00:00: weight = 0.3
    Resource-Metrics
        Resource-Metric A: weight = 0.0
        Resource-Metric B: weight = 7.8
```

Each feature in a feature relationship tree is assigned a list of date-time values and date-time weights from the third mathematical matrix and a list of resource-metric identifiers and resource-metric weights from the second mathematical matrix. The feature relationship tree is an abstract concept. Any computational associations between the features and date-time values, date-time weights, resource-metric identifiers, and resource-metric weights may be used.

The date-time weights and resource-metric weights for each feature may be sorted in descending order and the features themselves are sorted by the top weighted date-time. Further, the date-time weights and resource-metric weight lists for each feature are pruned leaving only the top N1 and N2 nodes of each. Then any feature not containing a date-time weight corresponding to the most recent date-time value may be discarded.

A predicted resource value for the most recent date-time value is generated for each resource-metric remaining in the feature relationship tree. This may be accomplished via an averaging algorithm, for example, k-Nearest Neighbor (k-NN) algorithm. To improve accuracy of the prediction, the historical resource-metric data supplied to the k-NN algorithm as the training set (a second set of records) may be gathered using a second predetermined time interval. The second predetermined time interval may be, for example, twice as large as the first predetermined time interval used to gather the original dataset (the first set of records). Data corresponding to the most recent date-time value may be omitted from the training data. The most recent date-time value may be used as the input parameters to the algorithm.

The variance of each resource-metric predicted vs. actual value may be calculated as a normalized value on a sliding scale. For example as value between 0 and 1 using a Gaussian function, where x=predicted resource value, y=actual resource value, and k=a constant used to position the apex of the function's "bell" curve.

Sample formula for calculating variance    Formula 3

$$f(x, y) = e^{-\frac{(x-k)^2}{2y^2}}.$$

In a preferred embodiment the alert conditions may be re-verified before issuing an alert by retrieving the latest metric's values for the resource-metrics with the variance exceeding the predetermined alert threshold. The resource-metrics found with the latest values still exceeding the predicted value will trigger an alert.

An alert may be issued as a message to a user, an email message, a text message, a telephone call, a pager call, a facsimile, or be routed to one of the messaging pipelines, e.g., Nagios®, Power Admin Monitor™, Microsoft® Monitoring Server, Sun® Monitoring Server, and many others.

The invention may be implemented on a variety of computer networks. This may include a LAN (Local Area Network), WLAN (Wireless Local Area Network), WAN (Wide Area Network), MAN (Metropolitan Area Network), a global network, etc. The Internet is a widely-used global computer network. The computer networks may support a variety of a network layer protocols, such as, DHCP (Dynamic Host Configuration Protocol), DVMRP (Distance Vector Multicast Routing Protocol), ICMP/ICMPv6 (Internet Control Message Protocol), IGMP (Internet Group Management Protocol), IP (Internet Protocol version 4), IPv6 (Internet Protocol version 6), MARS (Multicast Address Resolution Server), PIM and PIM-SM (Protocol Independent Multicast-Sparse Mode), RIP2 (Routing Information Protocol), RIPng for IPv6 (Routing Information Protocol for IPv6), RSVP (Resource ReSerVation setup Protocol), VRRP (Virtual Router Redundancy Protocol), etc. Further, the computer networks may support a variety of a transport layer protocols, such as, ISTP (Internet Signaling Transport Protocol), Mobile IP (Mobile IP Protocol), RUDP (Reliable UDP), TALI (Transport Adapter Layer Interface), TCP (Transmission Control Protocol), UDP (User Datagram Protocol), Van Jacobson (compressed TCP), XOT (X.25 over TCP), etc. In addition, the computer network may support a variety of an application layer protocols, such as, COPS (Common Open Policy Service), FANP (Flow Attribute Notification Protocol), Finger (User Information Protocol), FTP (File Transfer Protocol), HTTP (Hypertext Transfer Protocol), IMAP and IMAP4 (Internet Message Access Protocol, rev 4), IMPPpre (Instant Messaging Presence Protocol), IMPPmes (Instant Messaging Protocol), IPDC (IP Device Control), IRC (Internet Relay Chat Protocol), ISAKMP (Internet Message Access Protocol version 4rev1), ISP, NTP (Network Time Protocol), POP and POP3 (Post Office Protocol, version 3), Radius (Remote Authentication Dial In User Service), RLOGIN (Remote Login), RTSP (Real-time Streaming Protocol), SCTP (Stream Control Transmission Protocol), S-HTTP or HTTPS (Secure Hypertext Transfer Protocol), SLP (Service Location Protocol), SMTP (Simple Mail Transfer Protocol), SNMP (Simple Network Management Protocol), SOCKS (Socket Secure Server), TACACS+ (Terminal Access Controller Access Control System), TELNET (TCP/IP Terminal Emulation Protocol), TFTP (Trivial File Transfer Protocol), WCCP (Web Cache Coordination Protocol), X-Window (X Window), etc.

The communication links for the computer networks may include telephone line, copper twisted pair, power-line, fiber-optic, cellular, satellite, dial-up, Ethernet, DSL, ISDN, T-1, DS-1, Wi-Fi, etc.

A variety of programming languages and scripts may be used to implement the present invention, such as, Java, JavaScript, Perl, PHP, ASP, ASP.NET, Visual J++, J#, C, C++, C#, Visual Basic, VB.Net, VBScript, etc.

The computers utilized in the present invention (for monitoring and analyzing the data or to collect the metric's values from) can run a variety of operating systems, such as, MICROSOFT WINDOWS, APPLE MAC OS X, UNIX, LINUX, GNU, BSD, FreeBSD, SUN SOLARIS, NOVELL NETWARE, OS/2, TPF, eCS (eComStation), VMS, Digital VMS, OpenVMS, AIX, z/OS, HP-UX, OS-400, etc. The computers utilized in the present invention can be based on a variety of hardware platforms, such as, x86, x64, INTEL, ITANIUM, IA64, AMD, SUN SPARC, IBM, HP, etc.

Figure 2:
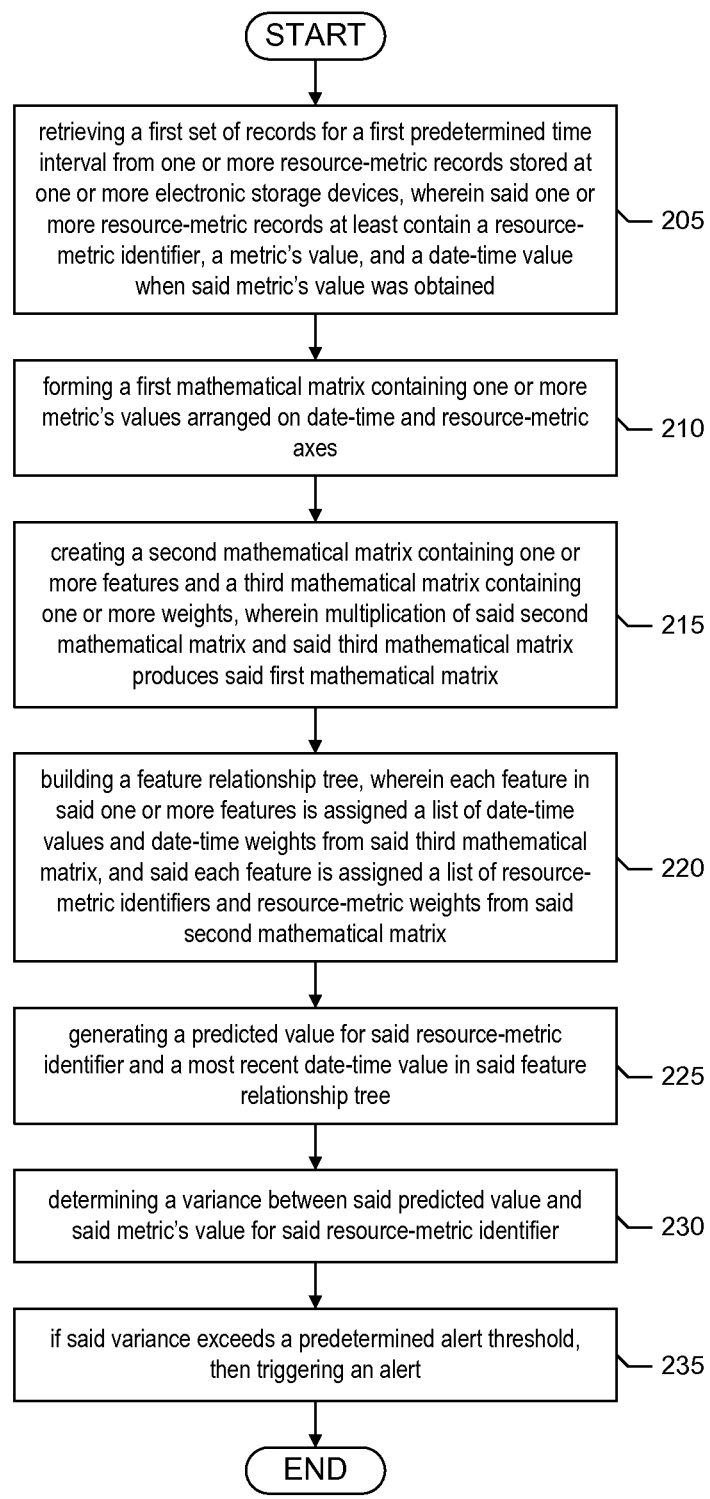
FIG. 2 is a flowchart illustrating an embodiment of a method of the present invention.

An exemplary embodiment of a method of present invention is shown in FIG. 2. The method comprises the steps of: retrieving a first set of records for a first predetermined time interval from one or more resource-metric records stored at one or more electronic storage devices, wherein said one or more resource-metric records at least contain a resource-metric identifier, a metric's value, and a date-time value when said metric's value was obtained (Step 205), forming a first mathematical matrix containing one or more metric's values arranged on date-time and resource-metric axes (Step 210), creating a second mathematical matrix containing one or more features and a third mathematical matrix containing one or more weights, wherein multiplication of said second mathematical matrix and said third mathematical matrix produces said first mathematical matrix (Step 215), building a feature relationship tree, wherein each feature in said one or more features is assigned a list of date-time values and date-time weights from said third mathematical matrix, and said each feature is assigned a list of resource-metric identifiers and resource-metric weights from said second mathematical matrix (Step 220), generating a predicted value for said resource-metric identifier and a most recent date-time value in said feature relationship tree (Step 225), determining a variance between said predicted value and said metric's value for said resource-metric identifier (Step 230), and if said variance exceeds a predetermined alert threshold, then triggering an alert (Step 235).

Figure 3:
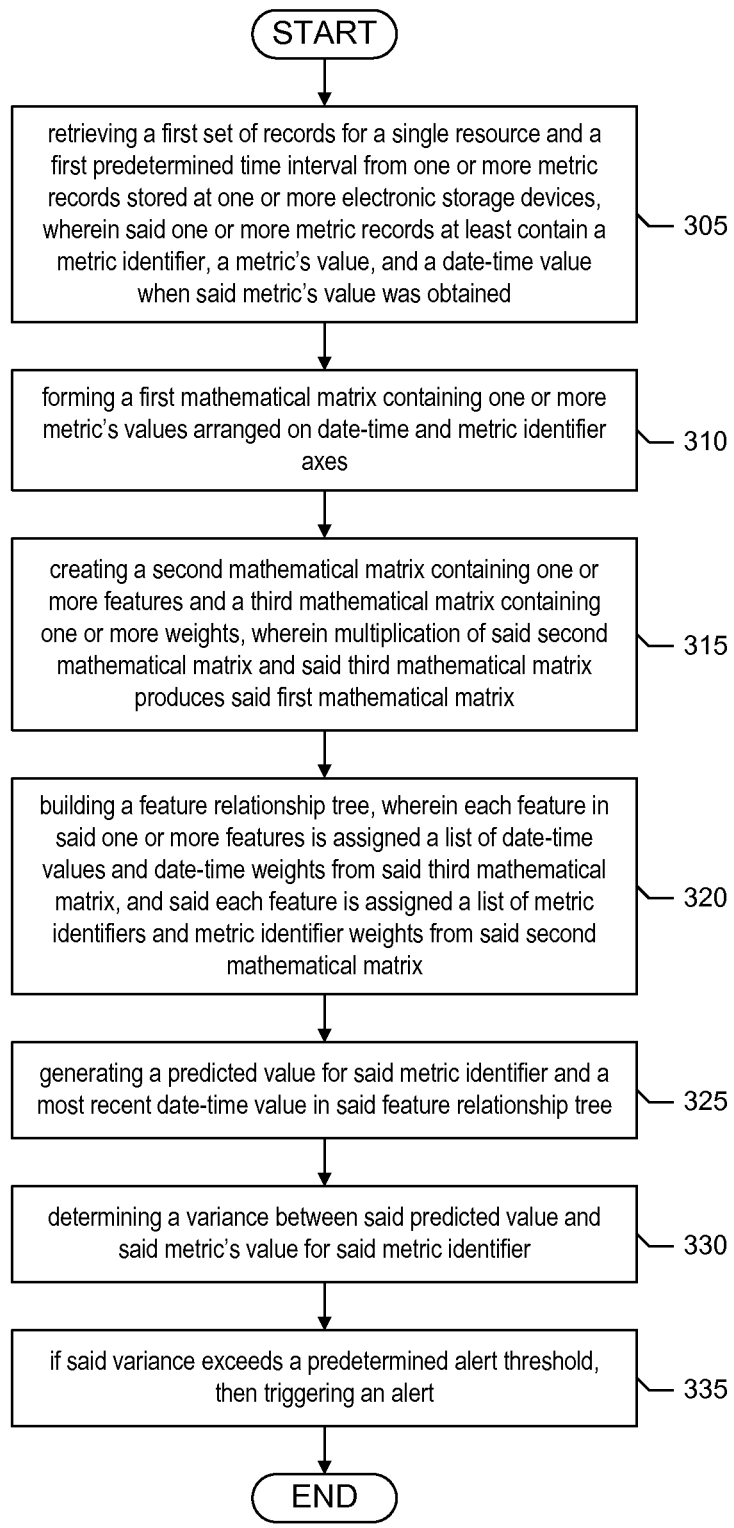
FIG. 3 is a flowchart illustrating an embodiment of a method of the present invention for a single resource.

An exemplary embodiment of a method of present invention for a single resource is shown in FIG. 3. The method comprises the steps of: retrieving a first set of records for a single resource and a first predetermined time interval from one or more metric records stored at one or more electronic storage devices, wherein said one or more metric records at least contain a metric identifier, a metric's value, and a date-time value when said metric's value was obtained (Step 305), forming a first mathematical matrix containing one or more metric's values arranged on date-time and metric identifier axes (Step 310), creating a second mathematical matrix containing one or more features and a third mathematical matrix containing one or more weights, wherein multiplication of said second mathematical matrix and said third mathematical matrix produces said first mathematical matrix (Step 315), building a feature relationship tree, wherein each feature in said one or more features is assigned a list of date-time values and date-time weights from said third mathematical matrix, and said each feature is assigned a list of metric identifiers and metric identifier weights from said second mathematical matrix (Step 320), generating a predicted value for said metric identifier and a most recent date-time value in said feature relationship tree (Step 325), determining a variance between said predicted value and said metric's value for said metric identifier (Step 330), and if said variance exceeds a predetermined alert threshold, then triggering an alert (Step 335).

Figure 4:
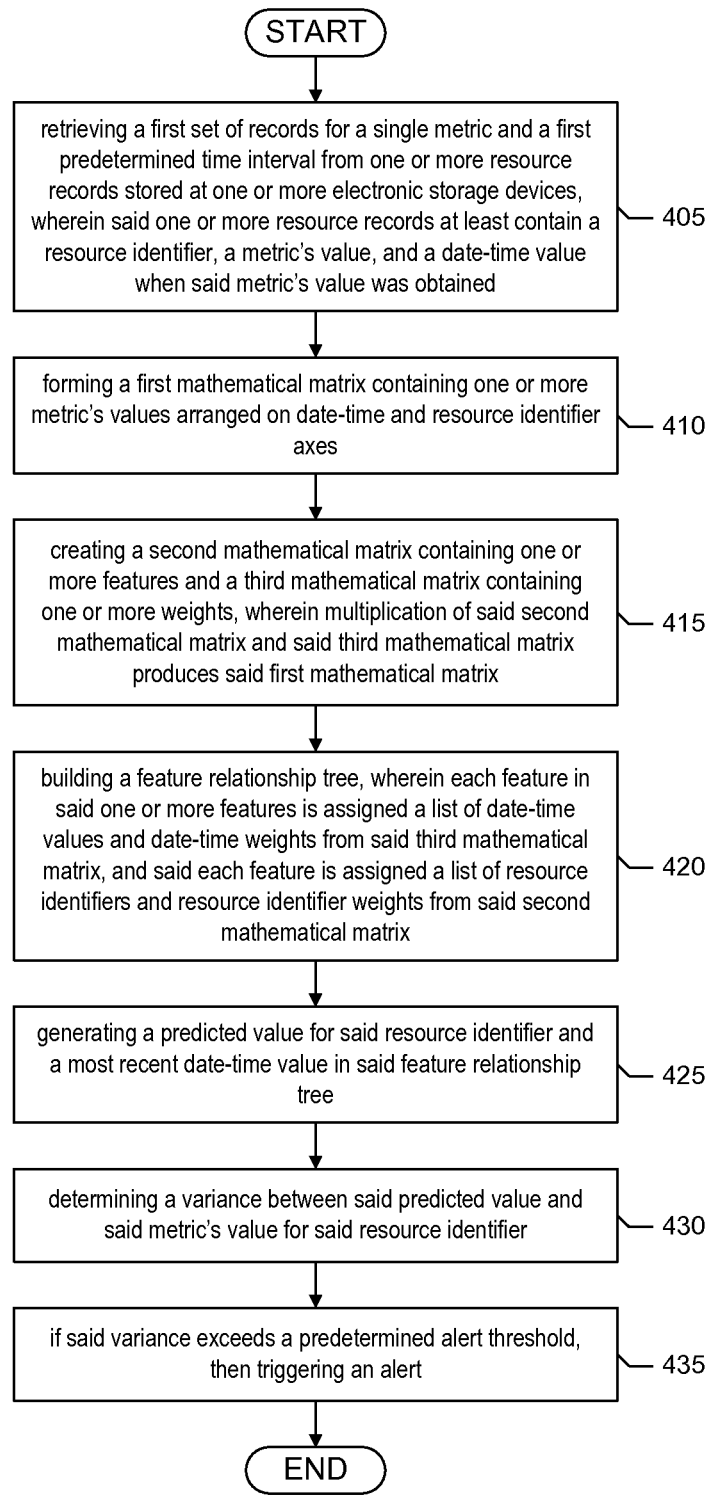
FIG. 4 is a flowchart illustrating an embodiment of a method of the present invention for a single metric.

An exemplary embodiment of a method of present invention is shown in FIG. 4. The method comprises the steps of: retrieving a first set of records for a single metric and a first predetermined time interval from one or more resource records stored at one or more electronic storage devices, wherein said one or more resource records at least contain a resource identifier, a metric's value, and a date-time value when said metric's value was obtained (Step 405), forming a first mathematical matrix containing one or more metric's values arranged on date-time and resource identifier axes (Step 410), creating a second mathematical matrix containing one or more features and a third mathematical matrix containing one or more weights, wherein multiplication of said second mathematical matrix and said third mathematical matrix produces said first mathematical matrix (Step 415), building a feature relationship tree, wherein each feature in said one or more features is assigned a list of date-time values and date-time weights from said third mathematical matrix, and said each feature is assigned a list of resource identifiers and resource identifier weights from said second mathematical matrix (Step 420), generating a predicted value for said resource identifier and a most recent date-time value in said feature relationship tree (Step 425), determining a variance between said predicted value and said metric's value for said resource identifier (Step 430), and if said variance exceeds a predetermined alert threshold, then triggering an alert (Step 435).

Figure 5:
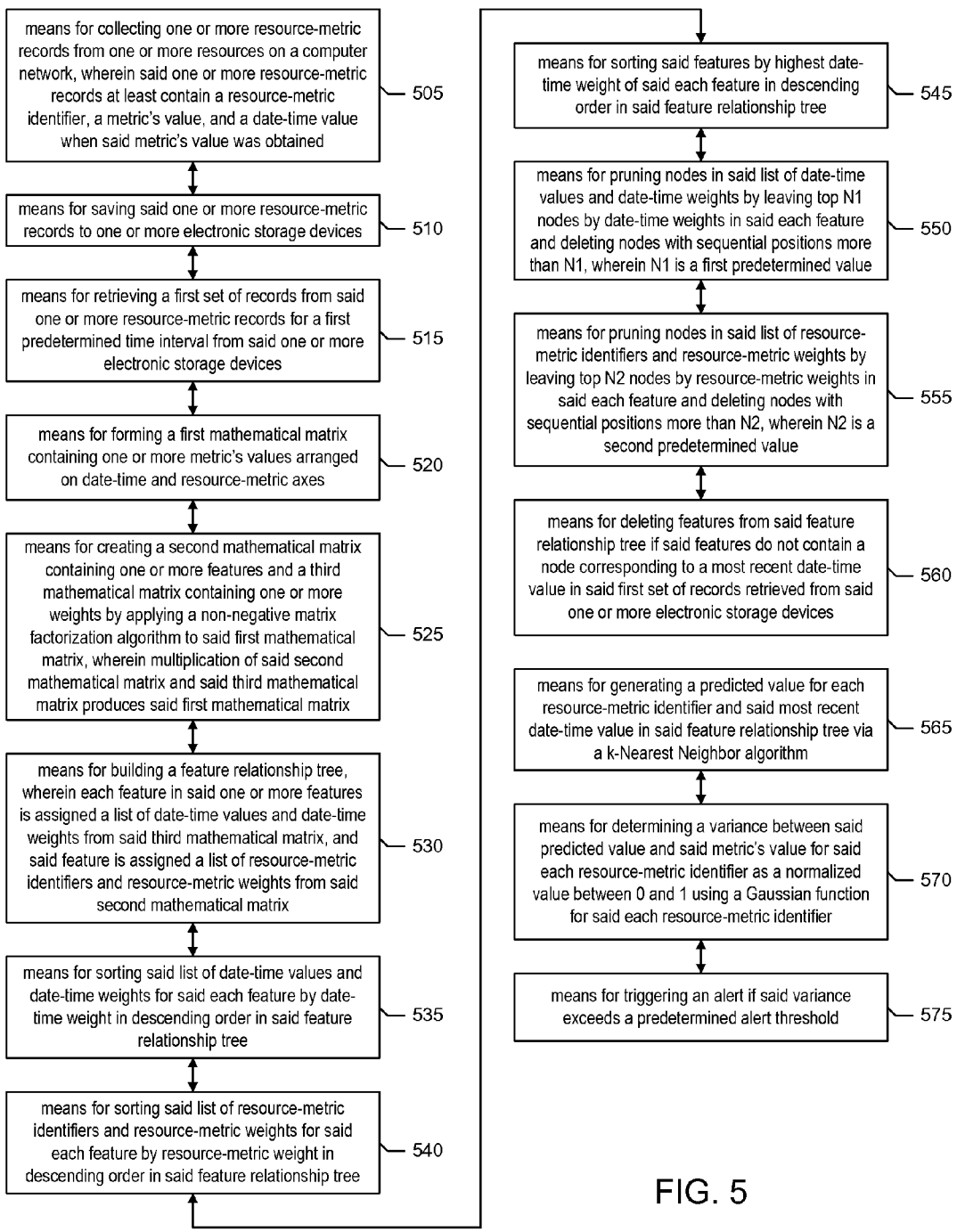
FIG. 5 is a block diagram illustrating an embodiment of means-plus-function system of the present invention.

Referring to FIG. 5, an exemplary embodiment of the system of the present invention may include: means for collecting one or more resource-metric records from one or more resources on a computer network, wherein said one or more resource-metric records at least contain a resource-metric identifier, a metric's value, and a date-time value when said metric's value was obtained (505), means for saving said one or more resource-metric records to one or more electronic storage devices (510), means for retrieving a first set of records from said one or more resource-metric records for a first predetermined time interval from said one or more electronic storage devices (515), means for forming a first mathematical matrix containing one or more metric's values arranged on date-time and resource-metric axes (520), means for creating a second mathematical matrix containing one or more features and a third mathematical matrix containing one or more weights by applying a non-negative matrix factorization algorithm to said first mathematical matrix, wherein multiplication of said second mathematical matrix and said third mathematical matrix produces said first mathematical matrix (525), means for building a feature relationship tree, wherein each feature in said one or more features is assigned a list of date-time values and date-time weights from said third mathematical matrix, and said feature is assigned a list of resource-metric identifiers and resource-metric weights from said second mathematical matrix (530), means for sorting said list of date-time values and date-time weights for said each feature by date-time weight in descending order in said feature relationship tree (535), means for sorting said list of resource-metric identifiers and resource-metric weights for said each feature by resource-metric weight in descending order in said feature relationship tree (540), means for sorting said features by highest date-time weight of said each feature in descending order in said feature relationship tree (545), means for pruning nodes in said list of date-time values and date-time weights by leaving top N1 nodes by date-time weights in said each feature and deleting nodes with sequential positions more than N1, wherein N1 is a first predetermined value (550), means for pruning nodes in said list of resource-metric identifiers and resource-metric weights by leaving top N2 nodes by resource-metric weights in said each feature and deleting nodes with sequential positions more than N2, wherein N2 is a second predetermined value (555), means for deleting features from said feature relationship tree if said features do not contain a node corresponding to a most recent date-time value in said first set of records retrieved from said one or more electronic storage devices (560), means for generating a predicted value for each resource-metric identifier and said most recent date-time value in said feature relationship tree via a k-Nearest Neighbor algorithm (565), means for determining a variance between said predicted value and said metric's value for said each resource-metric identifier as a normalized value between 0 and 1 using a Gaussian function for said each resource-metric identifier (570), and means for triggering an alert if said variance exceeds a predetermined alert threshold (575).

Figure 6:
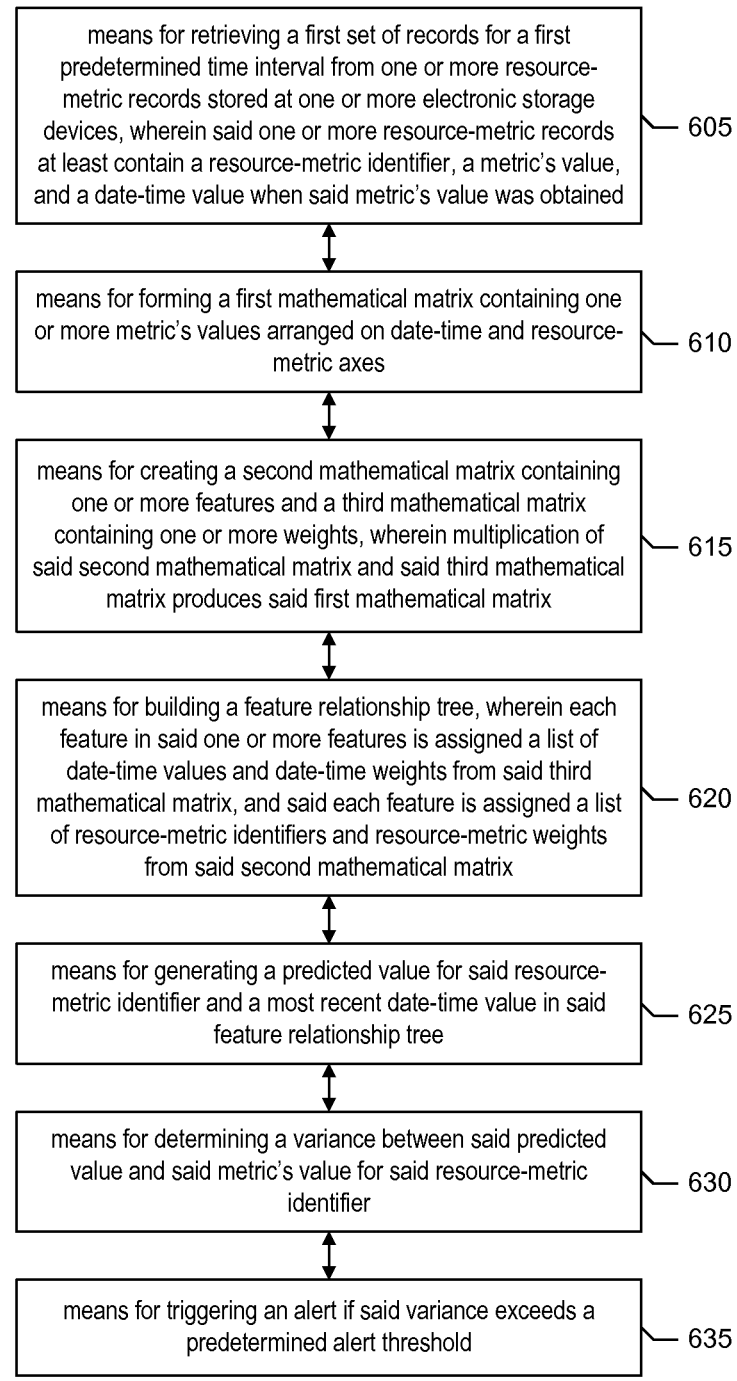
FIG. 6 is a block diagram illustrating an embodiment of means-plus-function system of the present invention.

Referring to FIG. 6, an exemplary embodiment of the system of the present invention may include: means for retrieving a first set of records for a first predetermined time interval from one or more resource-metric records stored at one or more electronic storage devices, wherein said one or more resource-metric records at least contain a resource-metric identifier, a metric's value, and a date-time value when said metric's value was obtained (605), means for forming a first mathematical matrix containing one or more metric's values arranged on date-time and resource-metric axes (610), means for creating a second mathematical matrix containing one or more features and a third mathematical matrix containing one or more weights, wherein multiplication of said second mathematical matrix and said third mathematical matrix produces said first mathematical matrix (615), means for building a feature relationship tree, wherein each feature in said one or more features is assigned a list of date-time values and date-time weights from said third mathematical matrix, and said each feature is assigned a list of resource-metric identifiers and resource-metric weights from said second mathematical matrix (620), means for generating a predicted value for said resource-metric identifier and a most recent date-time value in said feature relationship tree (625), means for determining a variance between said predicted value and said metric's value for said resource-metric identifier (630), and means for triggering an alert if said variance exceeds a predetermined alert threshold (635).

Figure 7:
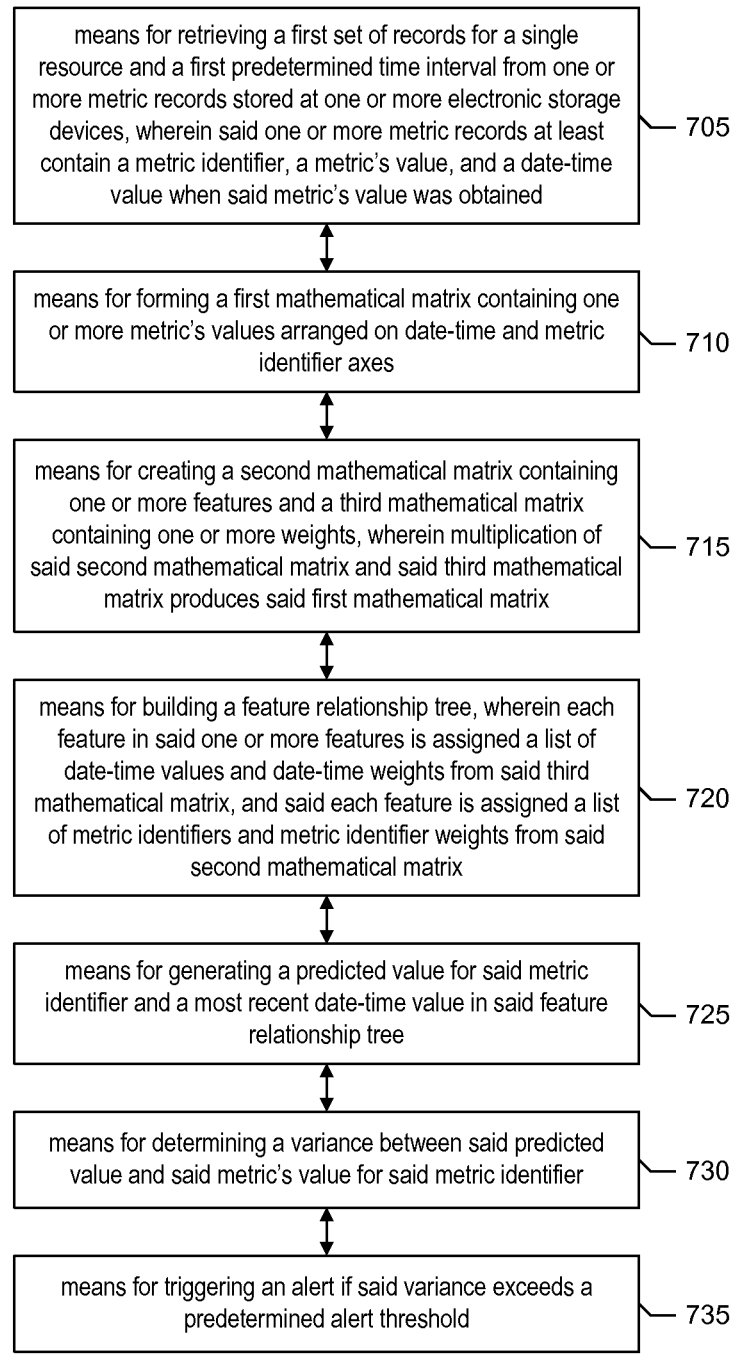
FIG. 7 is a block diagram illustrating an embodiment of means-plus-function system of the present invention for a single resource.

Referring to FIG. 7, an exemplary embodiment of the system of the present invention for a single resource may include: means for retrieving a first set of records for a single resource and a first predetermined time interval from one or more metric records stored at one or more electronic storage devices, wherein said one or more metric records at least contain a metric identifier, a metric's value, and a date-time value when said metric's value was obtained (705), means for forming a first mathematical matrix containing one or more metric's values arranged on date-time and metric identifier axes (710), means for creating a second mathematical matrix containing one or more features and a third mathematical matrix containing one or more weights, wherein multiplication of said second mathematical matrix and said third mathematical matrix produces said first mathematical matrix (715), means for building a feature relationship tree, wherein each feature in said one or more features is assigned a list of date-time values and date-time weights from said third mathematical matrix, and said each feature is assigned a list of metric identifiers and metric identifier weights from said second mathematical matrix (720), means for generating a predicted value for said metric identifier and a most recent date-time value in said feature relationship tree (725), means for determining a variance between said predicted value and said metric's value for said metric identifier (730), and means for triggering an alert if said variance exceeds a predetermined alert threshold (735).

Figure 8:
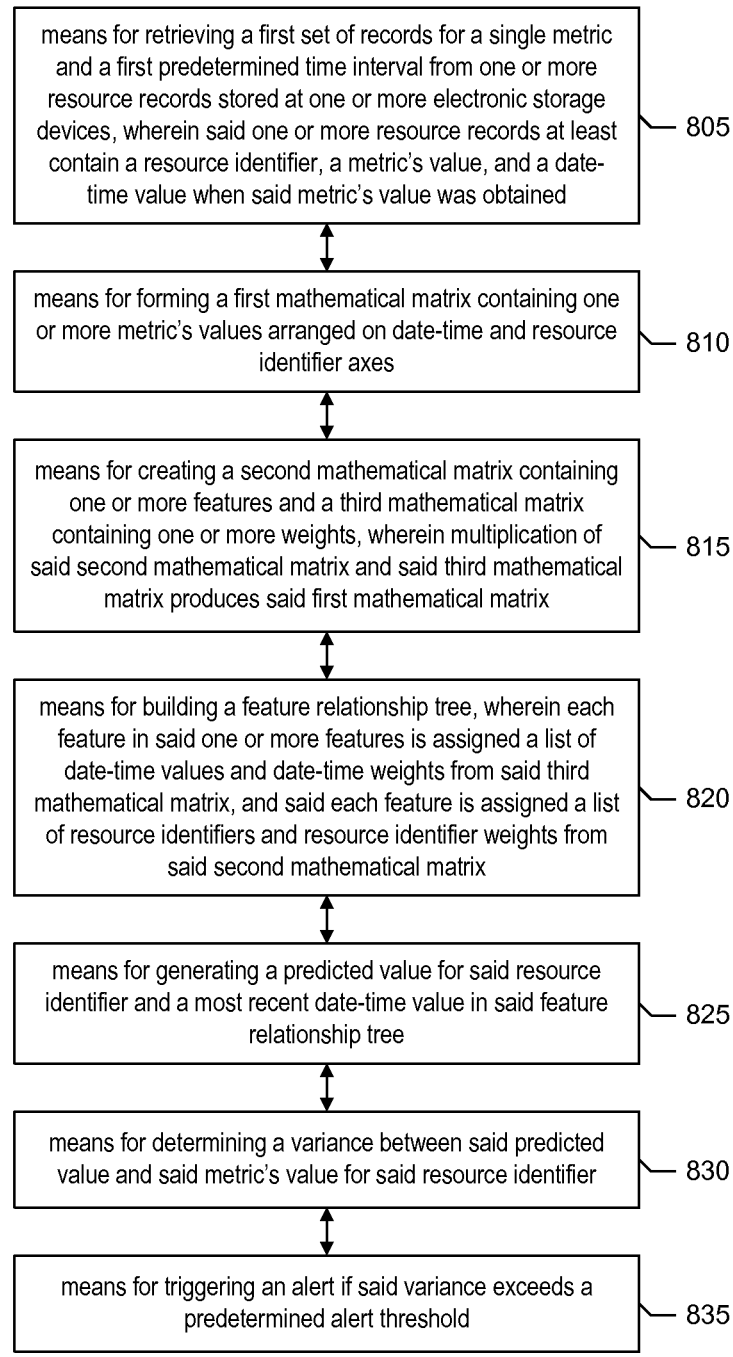
FIG. 8 is a block diagram illustrating an embodiment of means-plus-function system of the present invention for a single metric.

Referring to FIG. 8, an exemplary embodiment of the system of the present invention for a single metric may include: means for retrieving a first set of records for a single metric and a first predetermined time interval from one or more resource records stored at one or more electronic storage devices, wherein said one or more resource records at least contain a resource identifier, a metric's value, and a date-time value when said metric's value was obtained (805), means for forming a first mathematical matrix containing one or more metric's values arranged on date-time and resource identifier axes (810), means for creating a second mathematical matrix containing one or more features and a third mathematical matrix containing one or more weights, wherein multiplication of said second mathematical matrix and said third mathematical matrix produces said first mathematical matrix (815), means for building a feature relationship tree, wherein each feature in said one or more features is assigned a list of date-time values and date-time weights from said third mathematical matrix, and said each feature is assigned a list of resource identifiers and resource identifier weights from said second mathematical matrix (820), means for generating a predicted value for said resource identifier and a most recent date-time value in said feature relationship tree (825), means for determining a variance between said predicted value and said metric's value for said resource identifier (830), and means for triggering an alert if said variance exceeds a predetermined alert threshold (835).

The means of the embodiments disclosed in the present specification can be substituted with machines, apparatuses, and devices described or listed in this specification or equivalents thereof. As a non-limiting example, the means of the embodiments may be substituted with a computing device, a computer-readable code, a computer-executable code, or any combination thereof.

All embodiments of the present invention may further be limited and implemented with any and all limitations disclosed in this specification or in the documents incorporated in this patent application by reference.

Applicant does not consider any step, element, or limitation being required or essential. The methods and systems of the present invention may be implemented without some of the disclosed steps, elements, or limitations.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and is in no way intended for defining, determining, or limiting the present invention or any of its embodiments.

The invention claimed is:

1. A method, comprising the steps of:
   a) retrieving a first set of records for a first predetermined time interval from one or more resource-metric records stored at one or more electronic storage devices, wherein said one or more resource-metric records at least contain a resource-metric identifier, a metric's value, and a date-time value when said metric's value was obtained,
   b) forming a first mathematical matrix containing one or more metric's values arranged on date-time and resource-metric axes,
   c) creating a second mathematical matrix containing one or more features and a third mathematical matrix containing one or more weights, wherein multiplication of said second mathematical matrix and said third mathematical matrix produces said first mathematical matrix,
   d) building a feature relationship tree, wherein each feature in said one or more features is assigned a list of date-time values and date-time weights from said third mathematical matrix, and said each feature is assigned a list of resource-metric identifiers and resource-metric weights from said second mathematical matrix, e) generating a predicted value for said resource-metric identifier and a most recent date-time value in said feature relationship tree, f) determining a variance between said predicted value and said metric's value for said resource-metric identifier, and g) if said variance exceeds a predetermined alert threshold, then triggering an alert.

2. The method of claim 1, further comprising the step of:
h) collecting said one or more resource-metric records from one or more resources on a computer network.

3. The method of claim 1, further comprising the step of:
h) saving said one or more resource-metric records to said one or more electronic storage devices.

4. The method of claim 1, wherein said creating said second mathematical matrix and said third mathematical matrix is achieved by applying a non-negative matrix factorization algorithm to said first mathematical matrix.

5. The method of claim 1, further comprising the step of:
h) sorting said list of date-time values and date-time weights for said each feature by date-time weight in descending order in said feature relationship tree.

6. The method of claim 1, further comprising the step of:
h) sorting said list of resource-metric identifiers and resource-metric weights for said each feature by resource-metric weight in descending order in said feature relationship tree.

7. The method of claim 1, further comprising the step of:
h) sorting said features by highest date-time weight of said each feature in descending order in said feature relationship tree.

8. The method of claim 1, further comprising the step of:
h) pruning nodes in said list of date-time values and date-time weights by leaving top N1 nodes by date-time weights in said each feature and deleting nodes with sequential positions more than N1, wherein N1 is a first predetermined value.

9. The method of claim 1, further comprising the step of:
h) pruning nodes in said list of resource-metric identifiers and resource-metric weights by leaving top N2 nodes by resource-metric weights in said each feature and deleting nodes with sequential positions more than N2, wherein N2 is a second predetermined value.

10. The method of claim 1, further comprising the step of:
h) deleting features from said feature relationship tree if said features do not contain a node corresponding to said most recent date-time value in said first set of records retrieved from said one or more electronic storage devices.

11. The method of claim 1, wherein said generating said predicted value for said resource-metric identifier and said most recent date-time value in said feature relationship tree is achieved by averaging said metric's values.

12. The method of claim 1, wherein said generating said predicted value for said resource-metric identifier and said most recent date-time value in said feature relationship tree is achieved via a k-Nearest Neighbor algorithm.

13. The method of claim 1, wherein said variance between said predicted value and said metric's value is normalized on a sliding scale.

14. The method of claim 1, wherein said variance between said predicted value and said metric's value is normalized on a scale between 0 and 1.

15. The method of claim 1, wherein said variance between said predicted value and said metric's value is normalized using a Gaussian function.

16. The method of claim 1, further comprising the step of:
h) verifying that a latest metric's value for said resource-metric identifiers will trigger said alert before triggering said alert.

17. A method, comprising the steps of:
a) collecting one or more resource-metric records from one or more resources on a computer network, wherein said one or more resource-metric records at least contain a resource-metric identifier, a metric's value, and a date-time value when said metric's value was obtained, b) saving said one or more resource-metric records to one or more electronic storage devices, c) retrieving a first set of records from said one or more resource-metric records for a first predetermined time interval from said one or more electronic storage devices, d) forming a first mathematical matrix containing one or more metric's values arranged on date-time and resource-metric axes, e) creating a second mathematical matrix containing one or more features and a third mathematical matrix containing one or more weights by applying a non-negative matrix factorization algorithm to said first mathematical matrix, wherein multiplication of said second mathematical matrix and said third mathematical matrix produces said first mathematical matrix, f) building a feature relationship tree, wherein each feature in said one or more features is assigned a list of date-time values and date-time weights from said third mathematical matrix, and said feature is assigned a list of resource-metric identifiers and resource-metric weights from said second mathematical matrix, g) sorting said list of date-time values and date-time weights for said each feature by date-time weight in descending order in said feature relationship tree, h) sorting said list of resource-metric identifiers and resource-metric weights for said each feature by resource-metric weight in descending order in said feature relationship tree, i) sorting said features by highest date-time weight of said each feature in descending order in said feature relationship tree, j) pruning nodes in said list of date-time values and date-time weights by leaving top N1 nodes by date-time weights in said each feature and deleting nodes with sequential positions more than N1, wherein N1 is a first predetermined value, k) pruning nodes in said list of resource-metric identifiers and resource-metric weights by leaving top N2 nodes by resource-metric weights in said each feature and deleting nodes with sequential positions more than N2, wherein N2 is a second predetermined value, l) deleting features from said feature relationship tree if said features do not contain a node corresponding to a most recent date-time value in said first set of records retrieved from said one or more electronic storage devices, m) generating a predicted value for each resource-metric identifier and said most recent date-time value in said feature relationship tree via a k-Nearest Neighbor algorithm, n) determining a variance between said predicted value and said metric's value for said each resource-metric identifier as a normalized value between 0 and 1 using a Gaussian function for said each resource-metric identifier, and o) if said variance exceeds a predetermined alert threshold, then triggering an alert.

18. A method, comprising the steps of:
a) retrieving a first set of records for a single resource and a first predetermined time interval from one or more metric records stored at one or more electronic storage devices, wherein said one or more metric records at least contain a metric identifier, a metric's value, and a date-time value when said metric's value was obtained,
b) forming a first mathematical matrix containing one or more metric's values arranged on date-time and metric identifier axes,
c) creating a second mathematical matrix containing one or more features and a third mathematical matrix containing one or more weights, wherein multiplication of said second mathematical matrix and said third mathematical matrix produces said first mathematical matrix,
d) building a feature relationship tree, wherein each feature in said one or more features is assigned a list of date-time values and date-time weights from said third mathematical matrix, and said each feature is assigned a list of metric identifiers and metric identifier weights from said second mathematical matrix,
e) generating a predicted value for said metric identifier and a most recent date-time value in said feature relationship tree,
f) determining a variance between said predicted value and said metric's value for said metric identifier, and
g) if said variance exceeds a predetermined alert threshold, then triggering an alert.

19. A method, comprising the steps of:
a) retrieving a first set of records for a single metric and a first predetermined time interval from one or more resource records stored at one or more electronic storage devices, wherein said one or more resource records at least contain a resource identifier, a metric's value, and a date-time value when said metric's value was obtained,
b) forming a first mathematical matrix containing one or more metric's values arranged on date-time and resource identifier axes,
c) creating a second mathematical matrix containing one or more features and a third mathematical matrix containing one or more weights, wherein multiplication of said second mathematical matrix and said third mathematical matrix produces said first mathematical matrix,
d) building a feature relationship tree, wherein each feature in said one or more features is assigned a list of date-time values and date-time weights from said third mathematical matrix, and said each feature is assigned a list of resource identifiers and resource identifier weights from said second mathematical matrix,
e) generating a predicted value for said resource identifier and a most recent date-time value in said feature relationship tree,
f) determining a variance between said predicted value and said metric's value for said resource identifier, and
g) if said variance exceeds a predetermined alert threshold, then triggering an alert.

* * * * *